(12) United States Patent
Jang et al.

(10) Patent No.: US 12,497,296 B2
(45) Date of Patent: Dec. 16, 2025

(54) CARBON NANOTUBE HAVING LOW DENSITY AND COMPOSITE MATERIAL INCLUDING THE SAME

(71) Applicant: LG CHEM, LTD., Seoul (KR)

(72) Inventors: Hyung Sik Jang, Daejeon (KR); Hye Jin Park, Daejeon (KR); Se Hyun Kim, Daejeon (KR); Og Sin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 502 days.

(21) Appl. No.: 17/928,890

(22) PCT Filed: Aug. 6, 2021

(86) PCT No.: PCT/KR2021/010408
§ 371 (c)(1),
(2) Date: Nov. 30, 2022

(87) PCT Pub. No.: WO2022/035142
PCT Pub. Date: Feb. 17, 2022

(65) Prior Publication Data
US 2023/0227312 A1  Jul. 20, 2023

(30) Foreign Application Priority Data

Aug. 12, 2020  (KR) ................. 10-2020-0100834

(51) Int. Cl.
*C01B 32/158* (2017.01)
*C08K 3/04* (2006.01)

(52) U.S. Cl.
CPC ............ *C01B 32/158* (2017.08); *C08K 3/041* (2017.05); *C01B 2202/34* (2013.01); *C01P 2004/13* (2013.01); *C01P 2004/61* (2013.01); *C01P 2006/10* (2013.01)

(58) Field of Classification Search
CPC ... C01B 32/158; C08K 3/041; C01P 2004/13; C01P 2004/61; C01P 2006/10
See application file for complete search history.

(56) References Cited

U.S. PATENT DOCUMENTS

| | | |
|---|---|---|
| 2004/0151654 A1 | 8/2004 | Wei et al. |
| 2010/0074833 A1 | 3/2010 | Nakayama et al. |
| 2013/0039839 A1 | 2/2013 | Hocke et al. |
| 2013/0207026 A1 | 8/2013 | Kim et al. |
| 2013/0207051 A1 | 8/2013 | Ryu et al. |
| 2013/0316160 A1 | 11/2013 | Hata et al. |
| 2014/0217331 A1 | 8/2014 | Hata et al. |
| 2014/0255698 A1 | 9/2014 | Kang et al. |
| 2014/0328744 A1 | 11/2014 | Kang et al. |
| 2015/0151970 A1 | 6/2015 | Kang et al. |
| 2016/0211049 A1 | 7/2016 | Choi et al. |

(Continued)

FOREIGN PATENT DOCUMENTS

| | | |
|---|---|---|
| CN | 102770206 | 11/2012 |
| CN | 103842290 | 6/2014 |
| CN | 104136367 | 11/2014 |

(Continued)

*Primary Examiner* — Richard M Rump
(74) *Attorney, Agent, or Firm* — BRYAN CAVE LEIGHTON PAISNER LLP

(57) ABSTRACT

Low-density carbon nanotubes may be prepared using a fluidized bed reactor provided with a side nozzle, and are excellent in electrical properties and appearance characteristics when used as a composite material.

7 Claims, 2 Drawing Sheets

(56) References Cited

U.S. PATENT DOCUMENTS

| | | |
|---|---|---|
| 2018/0198129 A1 | 7/2018 | Kim et al. |
| 2019/0044150 A1 | 2/2019 | Kim et al. |

FOREIGN PATENT DOCUMENTS

| | | |
|---|---|---|
| CN | 106062062 | 10/2016 |
| CN | 107108954 | 8/2017 |
| EP | 1391425 A1 | 2/2004 |
| EP | 3301745 A1 | 4/2018 |
| JP | 2010-013312 A | 1/2010 |
| JP | 6229235 B | 11/2017 |
| KR | 10-2005-0037180 A | 4/2005 |
| KR | 10-2009-0013503 A | 2/2009 |
| KR | 10-2009-0073346 A | 7/2009 |
| KR | 10-1197288 B | 11/2012 |
| KR | 10-2013-0026419 A | 3/2013 |
| KR | 10-2013-0082458 A | 7/2013 |
| KR | 10-2013-0082460 A | 7/2013 |
| KR | 10-2013-0093357 A | 8/2013 |
| KR | 10-1350690 B | 1/2014 |
| KR | 10-2015-0130044 A | 11/2015 |
| KR | 10-2017-0113250 A | 10/2017 |
| KR | 10-2018-0020901 A | 2/2018 |
| KR | 10-1923465 B | 11/2018 |

CARBON NANOTUBE HAVING LOW DENSITY AND COMPOSITE MATERIAL INCLUDING THE SAME

CROSS-REFERENCE TO RELATED APPLICATIONS

The present application is a National Phase entry pursuant to 35 U.S.C. § 371 of International Application No. PCT/KR2021/010408 filed on Aug. 6, 2021, and claims priority to and the benefit of Korean Patent Application No. 10-2020-0100834, filed on Aug. 12, 2020, in the Korean Intellectual Property Office, the disclosures of which are incorporated herein in their entirety by reference.

FIELD

The present invention relates to carbon nanotubes having a low bulk density and a small number average particle size, and a composite material including the same

BACKGROUND

Carbon nanomaterials are categorized by their shape: fullerenes, carbon nanotubes (CNTs), graphene, and graphite nanoplates, and out of the categorized items, carbon nanotubes are macromolecules made out of nano-sized, rolled-up sheets of graphene with a hexagonal honeycomb network where one carbon atom is boned with three other carbon atoms.

Carbon nanotubes are lightweight due to their inner hollow space, and have electrical conductivity as good as that of copper, thermal conductivity as good as that of diamond, and tensile strength as good as that of steel. Carbon nanotubes are also categorized by how they are rolled up: single-walled carbon nanotubes (SWCNTs), multi-walled carbon nanotubes (MWCNTs), or rope carbon nanotubes.

Such carbon nanotubes have attracted a great deal of attention due to their special physical properties for a wide range of polymer composite fillers including antistatic polymer composites, EMI-shielding polymer composites, heat-resistant polymer composites, high-strength polymer composite, and so forth, and extensive research and development work has been in progress to commercialize polymer composites using carbon nanotubes. However, when carbon nanotubes are mixed with polymers to produce composite materials, the structural characteristics of the carbon nanotubes may cause a significant increase in the viscosity of the composite materials. The increase in the viscosity of the composite materials may affect molding of products obtained from the composite materials, and also reduce the productivity of the composite materials themselves, and thus there remains a need for research on carbon nanotubes that are provided with satisfactory viscosity and fluidity when applied to the composite materials, and work well when replacing the conventional job of carbon nanotube composite materials to impart conductivity.

(Patent Document 1) KR 10-2009-0073346
(Patent Document 2) KR 10-2009-0013503

SUMMARY

The present invention is to provide carbon nanotubes having a lower bulk density and a small number average particle size than conventional carbon nanotubes, and a carbon nanotube composite material including the same.

The present invention provides carbon nanotubes having a number average particle size of 40 to 120 μm and a bulk density of 25 kg/m³ or less, and a carbon nanotube composite material including the carbon nanotubes.

Carbon nanotubes provided by the present invention provides benefits of excellent electrical conductivity due to a small number average particle size and a low bulk density, and excellent appearance characteristics when mixed with a polymer resin and injection-molded as a composite material.

DETAILED DESCRIPTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Carbon Nanotubes

The present invention provides carbon nanotubes having a number average particle size of 40 to 120 μm and a bulk density of 25 kg/m³ or less.

The inventor of the present invention has found out that carbon nanotubes having a smaller number average particle size and a lower bulk density than carbon nanotubes obtained through conventional methods are achievable when the carbon nanotubes are obtained through a fluidized bed reactor provided with a side nozzle, and thus have devised the present invention.

Specifically, when carbon nanotubes are obtained through a conventional fluidized bed reactor, in a lower region of the fluidized bed reactor, the carbon nanotubes injected into the bed and the carbon nanotubes synthesized from a catalyst aggregated, and accordingly, there was a limit to reducing the bulk density and the number average particle size in finally obtained carbon nanotube products. Against this backdrop, the inventor of the present invention intended to obtain carbon nanotubes having a lower bulk density and a smaller number average particle size than conventional carbon nanotubes, and found out that reduction in the bulk density and number average particle size of the obtained carbon nanotubes were made possible when additional gas was injected through a side nozzle installed in a fluidized bed reactor, and thus have achieved the present invention.

More specifically, when carbon nanotubes are obtained using a fluidized bed reactor provided with a side nozzle, separately from gas injected through a lower distribution plate, gas injected through the side nozzle may prevent the formation of aggregates, and accordingly, finally obtained carbon nanotube products may have a reduced bulk density and a reduced number average particle size.

Figure 1:
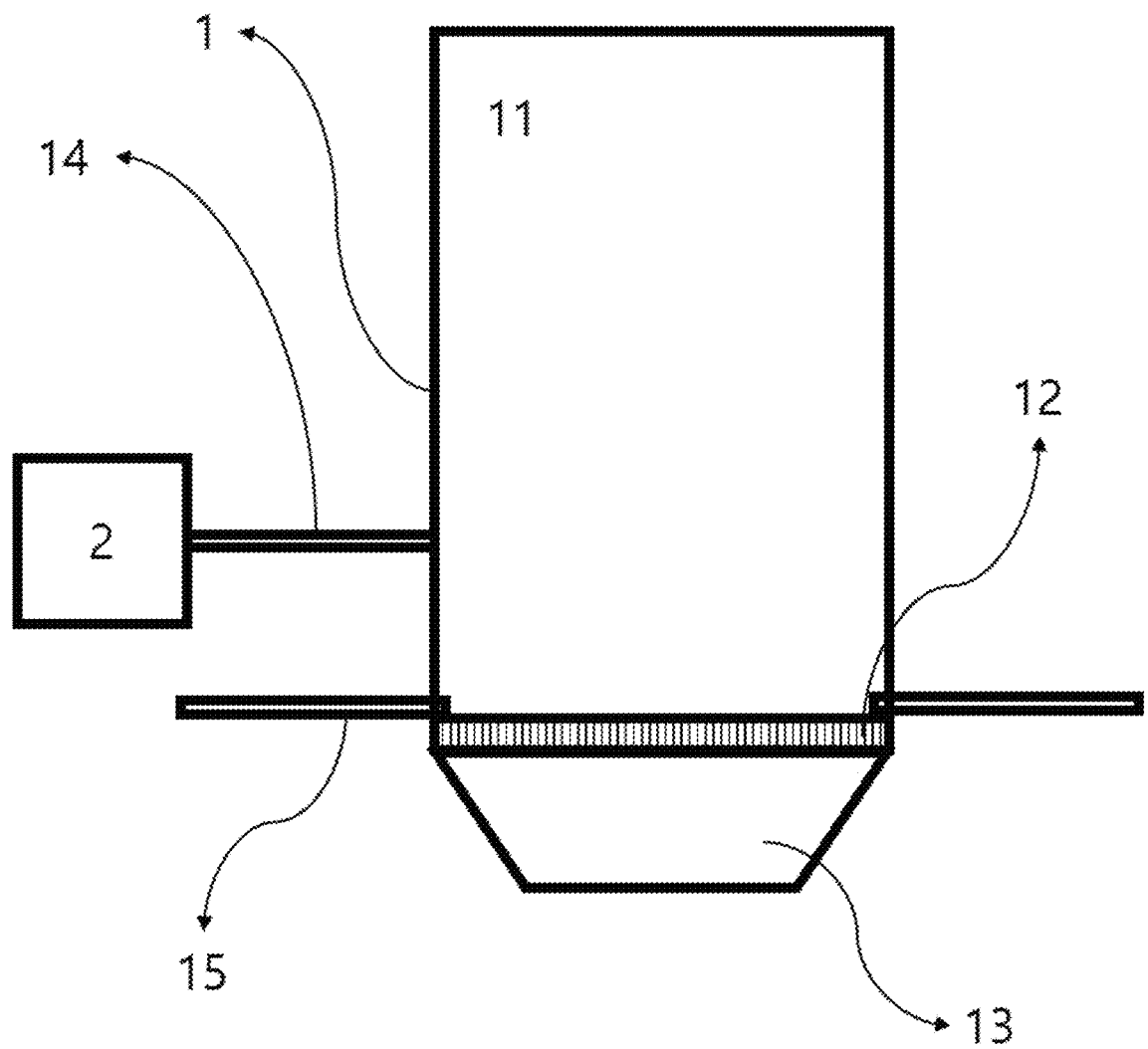
FIG. 1 is a schematic illustration showing a structure of a fluidized bed reactor provided with a side nozzle used for preparing carbon nanotubes of the present invention.

For example, a fluidized bed reactor having a side nozzle that may be used for preparing carbon nanotubes of the present invention may be in the form shown in FIG. 1. Specifically, the fluidized bed reactor used for preparing carbon nanotubes of the present invention may include a gas distribution plate 12, a gas supplier 13, a catalyst supplier 14, and a side nozzle 15 in an inner portion 11 of a reactor body 1, and may include a catalyst storage tank 2 on the outside of the reactor body 1. More specifically, the fluidized bed reactor of the present invention may include a reactor body, a gas distribution plate provided in the inner portion of the reactor body and having an opening through which gas may flow, a gas supplier for supplying gas from the bottom to the top of the inner portion of the body through the opening of the gas distribution plate, a catalyst supplier provided in a lower portion of the reactor body and supplying a catalyst from a catalyst storage tank to the inner portion of the reactor body, and a side nozzle provided on a wall surface of the reactor and having a gas inlet for injecting gas from the outside of the reactor into the inner portion of the reactor.

In the fluidized bed reactor having the side nozzle, the gas distribution plate, the gas supplier, and the catalyst supplier work the same as in conventional fluidized bed reactors, that is, the conventional fluidized bed reactors without side nozzles, and those skilled in the art may suitably select and change the form or type within the range that allows the function to work. Meanwhile, the side nozzle is provided on the wall surface of the reactor and with a gas inlet for injecting gas from the outside of the reactor into the inner portion of the reactor. The side nozzle serves to inject additional gas into the reactor separately from the gas supplier described above, and the additional gas injected through the side nozzle may suppress the formation of aggregates during reactions or remove previously formed aggregates. Specifically, the additional gas injected through the side nozzle variously changes fluid flow inside the fluidized bed reactor, and thus may prevent intensive accumulation of carbon nanotubes generated in a specific region, and accordingly, may suppress the formation of aggregates in the lower portion of the reactor.

The side nozzle may be positioned higher than the gas distribution plate with respect to the height of the body. The formation of aggregates takes places in a fluidized bed formed in an upper region with respect to the gas distribution plate, and accordingly, additional gas to suppress the formation of aggregates needs to be injected into the upper portion of the gas distribution plate as well. Therefore, the side nozzle is preferably positioned higher than the gas distribution plate. In particular, the side nozzle is preferably positioned to be in contact with an upper surface of the gas distribution plate. The region where the aggregates are mainly formed in a conventional fluidized bed reactor is a region where reactions are performed without sufficiently dispersing the reactant gas injected through the gas distribution plate, that is, a region positioned right above the gas distribution plate, and accordingly, when the side nozzle is positioned to be in contact with the upper surface of the gas distribution plate, such area may be minimized, and the reactant gas injected through the gas distribution plate may be better dispersed.

The number of side nozzles is not particularly limited, and when a plurality of side nozzles are included, the number may vary depending on the flow rate of the additional gas injected through the side nozzles and the diameter of a reactor, for example, the number may be 2 to 30. When a plurality of side nozzles are included, the formation of aggregates may be more effectively suppressed throughout the inner portion of the reactor, and in particular, when 2 to 10 side nozzles are included, the formation of aggregates is suppressed at maximum considering costs required to install the side nozzles. Meanwhile, when too many side nozzles are included, the structure of the side nozzles itself adversely affects the fluid flow inside the reactor.

Figure 2:
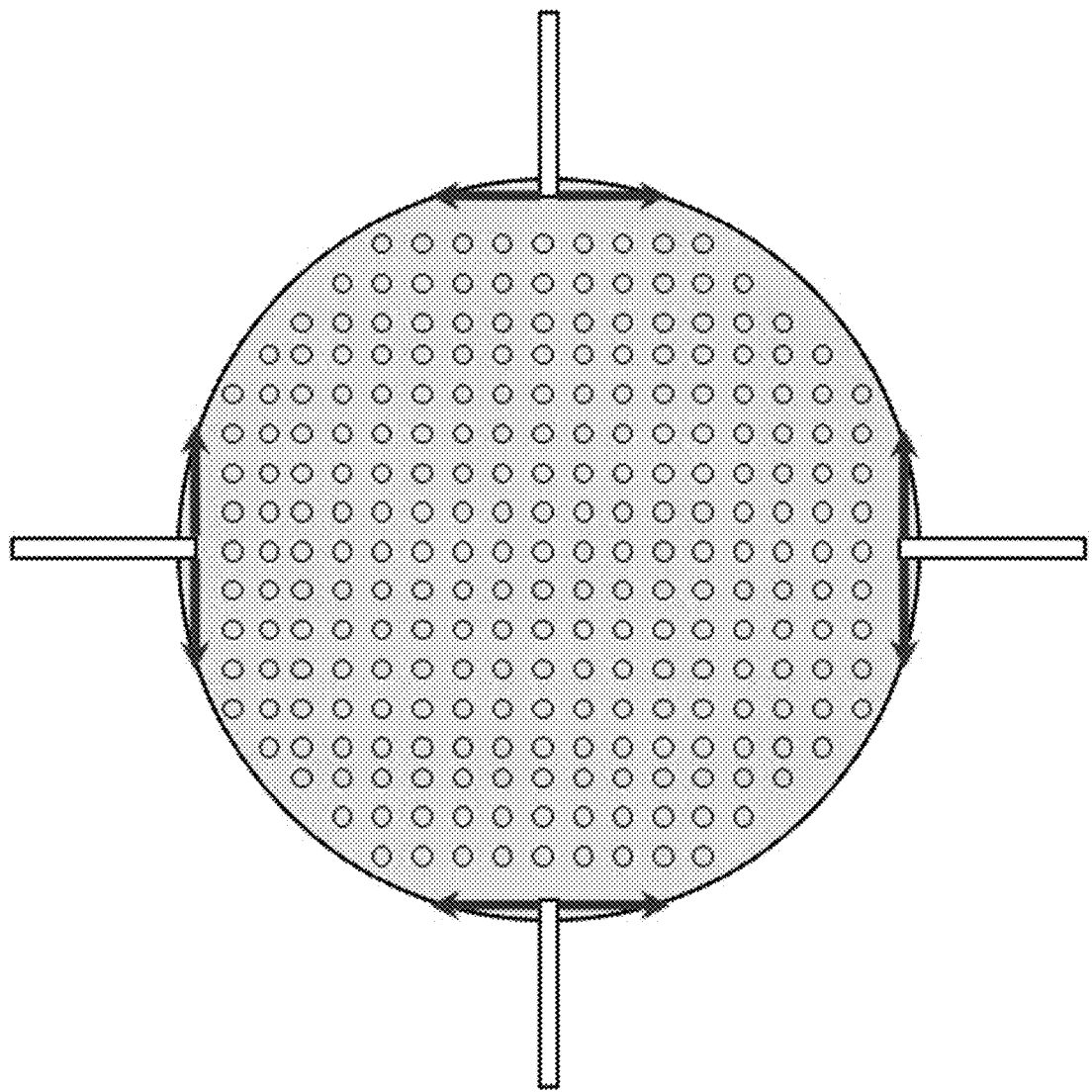
FIG. 2 is a schematic illustration showing a direction of a gas inlet of a side nozzle in the fluidized bed reactor according to FIG. 1.

The side nozzle is provided with a gas inlet for injecting gas in a direction towards the inside of the reactor, and the gas inlet may be one, such as in the form of a straw, or more than one, such as in the form of a sprinkler head. When a plurality of gas inlets are included, the gas inlets may be 2 to 8 gas inlets having different gas injection directions, for example, two gas inlets having different directions as shown in FIG. 2. When the side nozzle has a plurality of gas inlets, it is possible to create flow stream in various directions from one side nozzle, thereby suppressing the formation of aggregates more effectively. In particular, when the plurality of gas inlets have different directions, it is possible to create flow stream in more various directions. Meanwhile, the gas inlet may be provided with a single hole, or may be provided with a plurality of holes, such as a spray nozzle. When the gas inlet is provided with a plurality of holes, preferably fluid flow may be diversified.

Meanwhile, at least one of the gas inlets of the side nozzle may face a tangential direction, that is, a direction perpendicular to the side nozzle and parallel to the distribution plate. For example, as shown in FIG. 2, the direction of the gas inlet may be a tangential direction. When gas is injected in the tangential direction as described above, the formation of aggregates may be more effectively prevented compared to a case of injecting gas in the other direction.

The carbon nanotubes of the present invention may be prepared through chemical vapor deposition (CVD) using the fluidized bed reactor described above, and specifically, carbon source gas and a catalyst are injected into the fluidized bed reactor and subjected to reactions to prepare carbon nanotubes.

The carbon source gas is a carbon-containing gas that may be decomposed at high temperature to form carbon nanotubes, and specific examples of the carbon gas may include various carbon-containing compounds such as aliphatic alkanes, aliphatic alkenes, aliphatic alkynes, and aromatic compounds, and more specific examples of the carbon gas may include compounds such as methane, ethane, ethylene, acetylene, ethanol, methanol, acetone, carbon monoxide, propane, butane, benzene, cyclohexane, propylene, butene, isobutene, toluene, xylene, cumene, ethylbenzene, naphthalene, phenanthrene, anthracene, acetylene, formaldehyde, and acetaldehyde.

In particular, when methane, ethane, carbon monoxide, acetylene, ethylene, propylene, propane, butane, and liquefied petroleum gas (LPG), which is a mixture are used as the carbon source gas, the compounds are easily injected into a reactor and excellent in process economics.

For the catalyst, any catalyst that is known to be used in the preparation of carbon nanotubes in the art may be used without any particular limitation, the catalyst may be a heterogeneous catalyst having a composite structure of an active metal and a support that may be generally used, and more specifically, a catalyst in the form of a supported catalyst or a co-precipitation catalyst may be used.

When a supported catalyst is used as the catalyst, bulk density is higher than that of a co-precipitation catalyst, and unlike the co-precipitation catalyst, the formation of aggregates of fine particles may be suppressed due to a small amount of fine particles of 10 microns or less, fine dust generation due to abrasion that may occur upon fluidization may be less likely to happen, and the reactor may stably work due to excellent mechanical strength of the catalyst itself.

Meanwhile, when a co-precipitation catalyst is used as the catalyst, the method for preparing the catalyst is simple, the costs of metal salts suitable as catalyst raw materials are low, which is beneficial in terms of manufacturing costs, and a specific surface area is wide and thus catalytic activity is high.

In addition to the carbon source gas and the catalyst, reducing gas and inert gas may be further used in the preparation of carbon nanotubes of the present invention through a fluidized bed reactor. The reducing gas is a gas for generating carbon nanotubes through reactions with the carbon source gas, and any gas having reducing properties may be applicable, and specifically, hydrogen gas or ammonia gas may be used.

In addition, the inert gas is for imparting fluidity of synthesized carbon nanotubes, and any gas capable of imparting fluidity without reacting with the carbon source gas and the reducing gas may be used without limitation, and for example, nitrogen or argon gas may be used.

When the reducing gas and the inert gas are used together with the carbon source gas, the volume ratio of the carbon source gas out of all the gases to be injected may be 0.1 to 0.3, preferably 0.15 to 0.25. When the ratio of the carbon source gas is less than or greater than the range, less or more carbon source gas is injected than the amount required for carbon nanotube synthesis, and thus a carbon source gas or a reducing gas that does not participate in the reaction is generated, thereby causing deterioration in overall efficiency and economics of the reaction.

The additional gas injected through the side nozzle in the fluidized bed reactor used in the present invention may be at least one selected from the group consisting of a carbon source gas, a reducing gas, and an inert gas. In that the additional gas may also act as a reactant gas, the additional gas preferably has the same components as some or all of the components included in the reactant gas, and in particular, in that the additional gas performs a uniform reaction, the additional gas preferably has the same components and composition as in the reactant gas or is an inert gas.

Meanwhile, in order to prepare carbon nanotubes that meet the conditions required by the present invention, the flow rate of the additional gas injected through the side nozzle may be less than 20%, preferably 10 to 15%, compared to the flow rate of the total gas injected through the side nozzle and the gas distribution plate. When the amount of additional gas injected through the side nozzle is too small, suppressing the formation of aggregates by the additional gas is hardly effective, and thus the number average particle size and the volume average particle size of the carbon nanotubes prepared may become very large, and when the amount is too large, injection of the additional gas increases the amount of entrainment of products, and thus product loss may increase or the flow reaction itself may hardly occur. Meanwhile, the additional gas injected through the side nozzle may be injected in a continuous mode or a pulsed mode. Given that the same amount of additional gas is injected, when injected in a pulsed mode, some aggregates may be formed between the injection cycles, and thus carbon nanotubes having a higher bulk density, a larger number average particle size, and a larger volume average particle size may be prepared as compared to when injected in a continuous manner.

In the present invention, the reaction for preparing carbon nanotubes is preferably performed at 600 to 750° C. When the temperature of the reaction is lower than the above range, a sufficient amount of energy to generate carbon nanotubes may not be supplied, and when the temperature is higher than the above range, thermal decomposition of a catalyst or the like may occur and the reaction may not be performed smoothly.

In addition, the reaction is preferably performed for 30 minutes to 2 hours. When the reaction takes too short, a large amount of low-growth carbon nanotubes results, and carbon nanotubes having a desired length and diameter are not formed, and when the reaction takes too long, the efficiency of the overall reaction is reduced.

The number average particle size of the carbon nanotubes provided by the present invention may be 120 μm or less or 115 μm or less. In addition, the number average particle size of the carbon nanotubes provided by the present invention may be 40 μm or more, 50 μm or more, 60 μm or more, 65 μm or more, 70 μm or more, or 75 μm or more. When the fluidized bed reactor as described above is used, carbon nanotubes having the number average particle size in the above range may be prepared, when a conventional fluidized bed reactor is used, carbon nanotubes having a larger number average particle size than the carbon nanotubes of the present invention result due to the formation of aggregates.

The volume average particle size of the carbon nanotubes provided by the present invention may be 600 μm or less, preferably 550 μm or less, and 400 μm or more, preferably 450 μm or more. When the fluidized bed reactor as described above is used, carbon nanotubes having the volume average particle size in the above range may be prepared, when a conventional fluidized bed reactor is used, carbon nanotubes having a larger volume average particle size than the carbon nanotubes of the present invention result due to the formation of aggregates.

In the carbon nanotubes provided by the present invention, the number average particle size indicates an average particle size value in the number distribution with respect to the particle size of carbon nanotube particles, and the volume average particle size indicates an average particle size value in the volume distribution with respect to the particle size of the carbon nanotube particles. The number average particle size and the volume average particle size may be measured through a particle size analyzer using a laser diffraction method. More specifically, a commercially available laser diffraction particle size measuring apparatus (e.g., Microtrac bluewave S3500) may be used.

In the carbon nanotubes provided by the present invention, the bulk density may be 25 kg/m$^3$ or less, preferably 15 to 25 kg/m$^3$, particularly preferably 20 to 25 kg/m$^3$. As in the case of the number average particle size, when the above-described fluidized bed reactor is used, fewer aggregates are formed, and thus carbon nanotubes having a relatively low bulk density result compared to the case where a conventional fluidized bed reactor is used. Meanwhile, the bulk density may be measured according to ASTM B329-06. Specifically, in the present invention, a stainless steel hollow 25 ml cylindrical container was used to measure the weight of carbon nanotubes actually contained in the 25 ml container, and the weight was divided by the volume of 25 ml to measure bulk density.

Having the number average particle size, the volume average particle size, and the bulk density within the range of the present invention, the carbon nanotubes have excellent electrical properties and fluidity when used as a component of a composite material, and have great appearance characteristics when injection-molded as a composite material. Therefore, the carbon nanotubes of the present invention are suitable for use in a technical field requiring the above properties, and is particularly suitable for use as a carbon nanotube composite material.

In the carbon nanotubes provided by the present invention, the ratio of the volume average particle size to the number average particle size of the carbon nanotubes (volume average particle size/number average particle size) may be 4.8 or more, preferably 4.9 or more, and 7.0 or less, preferably 6.5 or less. When the ratio between the number average particle size and the volume average particle size of the carbon nanotubes is within the range described above, the appearance may be exceptionally superb upon injection molding in the form of a composite material.

The carbon nanotubes provided by the present invention may be an entangled type or a bundle type. The entangled type refers to a secondary shape in the form of a sphere or potato in which a plurality of carbon nanotubes are entangled without directionality, and the bundle type refers to a secondary shape in the form of a bundle or rope in which a plurality of carbon nanotubes are arranged or aligned side by side in a predetermined direction.

Carbon Nanotube Composite Material

The present invention provides a carbon nanotube composite material including the above-described carbon nanotubes and a polymer resin. As described above, the carbon nanotubes provided by the present invention have a low bulk density and a small number average particle size, and thus may exhibit excellent electrical properties, appearance characteristics, and fluidity when applied as a composite material.

The carbon nanotube composite material of the present invention includes a polymer resin as a base. The polymer resin serves to constitute a basic matrix of the composite material, and preferably has thermoplasticity.

Examples of the polymer resin may include at least one selected from the group consisting of a vinyl-based polymer or a copolymer resin obtained by polymerizing or copolymerizing at least one vinyl monomer selected from the group consisting of an aromatic alkenyl compound, a methacrylic acid ester, an acrylic acid ester, and a vinyl cyanide compound; a diene-aromatic alkenyl compound copolymer resin, a vinyl cyanide-diene-aromatic alkenyl compound copolymer resin, an aromatic alkenyl compound-diene-vinyl cyanide-N-phenylmaleimide copolymer resin, a vinyl cyanide-(ethylene-diene-propylene (EPDM))-aromatic alkenyl compound copolymer resin, polyolefin, a vinyl chloride resin, a chlorinated vinyl chloride resin, a polycarbonate resin, a polypropylene resin, an aramid resin, an aromatic polyester resin, a polyolefin resin, a polyester carbonate resin, a polyphenylene oxide resin, a polysulfone resin, a polyethersulfone resin, a polyarylene resin, a cycloolefin-based resin, a polyetherimide resin, a polyacetal resin, a polyvinyl acetal resin, a polyketone resin, a polyetherketone resin, a polyetheretherketone resin, a polyarylketone resin, a polyethernitrile resin, a liquid crystal resin, a polybenzimidazole resin, a polyparabanic acid resin, a polyamide resin.

When a polyolefin resin is used as the polymer resin, polypropylene, polyethylene, polybutylene, and poly(4-methyl-1-pentene), and a combination thereof may be used.

When a polyester resin is used as the polymer resin, homopolyester or co-polyester which is a polycondensate of a dicarboxylic acid component skeleton and a diol component skeleton may be used. For example, the homopolyester may be polyethylene terephthalate, polypropylene terephthalate, polybutylene terephthalate, polyethylene-2,6-naphthalate, poly-1,4-cyclohexanedimethylene terephthalate, polyethylene diphenylate or the like, and preferably, polyethylene terephthalate is cost-effective. The copolymer polyester is defined as a polycondensate including at least three or more components selected from a compound having a dicarboxylic acid group and a compound having a diol group. Examples of the compound having a dicarboxyl group may include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenylsulfonedicarboxylic acid, adipic acid, sebacic acid, dimer acid, cyclohexanedicarboxylic acid, ester derivatives thereof, or the like, and examples of the compound having a diol group include ethylene glycol, 1,2-propanediol, 1,3-butanediol, 1,4-butanediol, 1,5-pentadiol, diethylene glycol, polyalkylene glycol, 2,2-bis(4'-(3-hydroxyethoxyphenyl)propane, isosorbate, 1,4-cyclohexanedimethanol, spiroglycol, or the like.

When a polyamide resin is used as the polymer resin, specifically, a nylon resin, a nylon copolymer resin, and a mixture thereof may be used. Examples of the nylon resin may include polyamide-6(nylon 6) obtained by ring-opening polymerization of lactams such as ε-caprolactam and ω-dodecaractam; nylon polymer obtained from amino acids such as aminocaproic acid, 11-aminoundecanoic acid, and 12-aminododecanoic acid; nylon polymer obtained by polymerization of aliphatic, alicyclic(cycloaliphatic), or aromatic diamines such as ethylenediamine, tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonahexamethylenediamine, metaxylenediamine, paraxylenediamine, 1,3-bisaminomethylcyclohexane, 1,4-bisaminomethylcyclohexane, 1-amino-3-aminomethyl-3,5,5-trimethylcyclohexane, bis(4-aminocyclohexane)methane, bis(4-methyl-4-aminocyclohexyl)methane, 2,2-bis(4-aminocyclohexyl)propane, bis(aminopropyl)piperazine, and aminoethylpiperidine, and aliphatic, alicyclic, or aromatic dicarboxylic acids such as adipic acid, sebacic acid, azelaic acid, terephthalic acid, 2-chloroterephthalic acid, and 2-methylterephthalic acid; and a copolymer or a mixture thereof. Examples of the nylon copolymer may include a copolymer of polycaprolactam (nylon 6) and polyhexamethylene sebacamide (nylon 6,10), a copolymer of polycaprolactam (nylon 6) and polyhexamethylene adipamide (nylon 66), a copolymer of polycaprolactam (nylon 6) and polylauryllactam (nylon 12) or the like.

When a polycarbonate resin is used as the polymer resin, one prepared by making diphenols react with phosgene, halogen formate, carbonic acid ester, or a combination thereof may be used. Examples of the diphenols may include hydroquinone, resorcinol, 4,4'-dihydroxydiphenyl, 2,2-bis(4-hydroxyphenyl)propane (also called 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis (3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, or the like. Among them, preferably, 2,2-bis(4-hydroxyphenyl) propane, 2,2-bis(3,5-dichloro-4-hydroxyphenyl)propane, or 1,1-bis(4-hydroxyphenyl)cyclohexane may be used, and preferably, 2,2-bis(4-hydroxyphenyl)propane may be used.

In addition, the polycarbonate resin may be a mixture of a copolymer prepared from two or more of diphenols. In addition, examples of the polycarbonate resin may include a linear polycarbonate resin, a branched polycarbonate resin, a polyester carbonate copolymer resin, or the like. Examples of the linear polycarbonate resin may include a bisphenol-A-based polycarbonate resin. Examples of the branched polycarbonate resin may include those prepared by making polyfunctional aromatic compounds such as trimellitic anhydride and trimellitic acid react with diphenols and carbonate. The polyfunctional aromatic compound may be included in an amount of 0.05 to 2 mol % with respect to the total amount of the branched polycarbonate resin. As the polyester carbonate copolymer resin, one prepared by making difunctional carboxylic acid react with diphenols and carbonate may be used. In this case, examples of the carbonate may include diaryl carbonate such as diphenyl carbonate, and ethylene carbonate.

In the carbon nanotube composite material of the present invention, the carbon nanotubes may be included in an amount of 0.5 to 10 wt %, preferably 1 to 8 wt %. When the carbon nanotubes are included in an amount less than the range above, conductivity is not sufficiently secured, and when the carbon nanotubes are included in an amount greater than the range above, fluidity is reduced.

In addition to the carbon nanotubes and the polymer resin described above, the carbon nanotube composite material of the present invention may include additional components, and specifically may further include at least one additive selected from the group consisting of a flame retardant, an impact modifier, a flame retardant, a flame retardant auxiliary, a lubricant, a plasticizer, a heat stabilizer, an anti-drip agent, an antioxidant, a compatibilizer, a light stabilizer, a pigment, a dye, an inorganic additive, and a drip inhibitor. When the additive is included, the content may be 0.1 to 10 parts by weight with respect to 100 parts by weight of the polymer resin. Specific types of these additives are well known to those skilled in the art, and those skilled in the art may select an appropriate type and content of the additives described above for desired effects and apply the selected additive to the carbon nanotube composite material of the present invention.

The carbon nanotube composite material of the present invention may be prepared according to a preparation method known to those skilled in the art, and for example, may be prepared by supplying a mixture of components included in the composite material to commonly known melt mixers such as a single or twin-screw extruder, a Banbury mixer, a kneader, or a mixing roll, and kneading the mixture at about 100 to 500° C., or 200 to 400° C.

Hereinafter, the present invention will be described in detail with reference to Examples and Experimental Examples, but the present invention is not limited by these Examples and Experimental Examples. Examples according to the present invention may be modified into other various forms, and the scope of the present invention should not be construed as being limited to the Examples described below. The embodiments of the present invention are provided to more fully describe the present invention to those skilled in the art.

EXAMPLES

Examples and Comparative Examples

In Examples 1 to 4 and Comparative Examples 2 to 3, carbon nanotubes were prepared through a fluidized bed reactor provided with a side nozzle as shown in FIG. 1. Nitrogen gas was used as an additional gas injected through the side nozzle. Meanwhile, in Comparative Example 1, carbon nanotubes were prepared using a conventional fluidized bed reactor with no side nozzles. In addition, in Comparative Examples 4 and 5, conventional carbon nanotube products known to have relatively low number average particle sizes and volume average particle sizes were used. In each Example and Comparative Example, the ratio of a total amount of gas injected into the fluidized bed reactor to additional gas injected through the side nozzle and an injection method, the bulk density, number average particle size, and volume average particle size of the carbon nanotubes prepared in each case are shown in Table 1 below.

TABLE 1

|  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|
| Addl. gas ratio (%) | 10 | 15 | 15 | 15 | 0 | 5 | 20 | — | — |
| Addl. gas inj. method | Cont. | Cont. | 5 times/min | 5 times/min |  | Cont. | Cont. |  |  |
| Bulk dens. (kg/m$^3$) | 24 | 20 | 23 | 24 | 28 | 28 | CNT were not smoothly prepared due to flow failure | 10 | 20 |
| Numb. av. part. size (μm) | 107 | 75 | 87 | 112 | 132 | 175 | | 21 | 15 |
| Volume av. part. size (μm) | 532 | 471 | 508 | 566 | 627 | 652 | | 105 | 150 |

The carbon nanotubes of Examples 1 to 4, which were prepared through a fluidized bed reactor having a side nozzle, and provided with an appropriately controlled amount of additional gas injected through the side nozzle showed a low bulk density and a number average particle size, whereas when a conventional fluidized bed reactor was used, or a fluidized bed reactor having a side nozzle was used but the amount of additional gas injected through the side nozzle was too small or too large, carbon nanotubes having a relatively high bulk density and large number average particle size were prepared, or carbon nanotubes were not prepared due to flow failure.

Experimental Example 2: Observation of Physical Properties in Producing Composite Materials The carbon nanotubes prepared in Examples and Comparative Examples were mixed with polycarbonate resins to produce composite materials. The carbon nanotube content in the composite materials was set to be 1.5 wt %, and the composite materials were extruded at 290° C. at 15 kg/h production condition, and injected at 290° C. at an injection speed of 30 mm/s to prepare specimens. Surface resistance, flow index, and appearance characteristics were measured for the prepared specimens. Specific measurement methods of each physical property are as follows.

Surface resistance: the surface resistance of the specimens was measured using a surface resistance measuring instrument SRM110.

Flow index (g/10 min): the flow index was measured by applying the same method except that the weight of a used weight in ASTM D1238 was changed to 2.18 kg instead of 1.2 kg.

Appearance characteristics (number of pinholes): surfaces of the specimens were observed through a microscope, and the observed images were transmitted to a computer to obtain images with an area of 1.1×0.8 cm² in a continuous shooting mode. Thereafter, boundaries between the pinhole and the plane were secured by adjusting the contrast of the obtained images, and pinholes with a circularity of 0.4 or more and a size of 50 μm or more were selected through image processing, and the number was counted.

The physical property values measured through the above measurement methods are shown in Table 2 below.

TABLE 2

| | Ex. 1 | Ex. 2 | Ex. 3 | Ex. 4 | Comp. Ex. 1 | Comp. Ex. 2 | Comp. Ex. 3 | Comp. Ex. 4 | Comp. Ex.5 |
|---|---|---|---|---|---|---|---|---|---|
| Surf, resist. (10^) | 9~10 | 9 | 9 | 9~10 | 9~10 | 11 | — | 7 | 8~9 |
| Flow index (g/10 min) | 23 | 25 | 24 | 22 | 23 | 20 | — | 7 | 12 |
| No. of pinholes (pcs/0.88 cm2) | 50 | 41 | 43 | 52 | 65 | 64 | — | 200 | 40 |

The results show that the carbon nanotubes of the present invention exhibited satisfactory fluidity similar to that of the existing carbon nanotubes when composite materials were applied, had excellent electrical properties due to low surface resistance, and had the number of pinholes on the specimen surface less than that of the existing carbon nanotubes upon injection, and thus had further excellent appearance characteristics.

In particular, in Comparative Examples 1 to 3 using carbon nanotubes having a number average particle size and bulk density greater than those of the carbon nanotubes of the present invention, it was observed that the surface resistance and flow index were similar to those of the present invention, but the appearance is inferior. In addition, in Comparative Examples 4 and 5 using carbon nanotubes having a smaller number average particle size than the carbon nanotubes of the present invention, it was observed that fluidity was reduced, and in particular, in Comparative Example 4, the number of pinholes (undispersed particles) significantly increased, thereby exhibiting inferior appearance characteristics.

DESCRIPTION OF SYMBOLS

1: Fluidized bed reactor
11: Inner portion of reaction body
12: Gas distribution plate
13: Gas supplier
14: Catalyst supplier
15: Side nozzle
2: Catalyst storage tank

The invention claimed is:

1. Carbon nanotubes having a number average particle size of 40 to 120 μm, a volume average particle size of 400 to 600 μm, and a bulk density of 25 kg/m³ or less.

2. The carbon nanotubes of claim 1, wherein the carbon nanotubes have a bulk density of 15 to 25 kg/m³.

3. The carbon nanotubes of claim 1, wherein the carbon nanotubes have a number average particle size of 75 to 115 μm.

4. The carbon nanotubes of claim 1, wherein a ratio of the volume average particle size to the number average particle size (volume average particle size/number average particle size) is 4.8 to 7.0.

5. A carbon nanotube composite material comprising:
the carbon nanotubes of claim 1; and
a polymer resin.

6. The carbon nanotube composite material of claim 5, wherein the polymer resin is at least one selected from the group consisting of a vinyl-based polymer or a copolymer resin obtained by polymerizing or copolymerizing at least one vinyl monomer selected from the group consisting of an aromatic alkenyl compound, a methacrylic acid ester, an acrylic acid ester, a vinyl cyanide compound, a diene-aromatic alkenyl compound copolymer resin, a vinyl cyanide-diene-aromatic alkenyl compound copolymer resin, an aromatic alkenyl compound-diene-vinyl cyanide-N-phenyl-maleimide copolymer resin, a vinyl cyanide-(ethylene-diene-propylene (EPDM))-aromatic alkenyl compound copolymer resin, polyolefin, a vinyl chloride resin, a chlorinated vinyl chloride resin, a polycarbonate resin, a polypropylene resin, an aramid resin, an aromatic polyester resin, a polyolefin resin, a polyester carbonate resin, a polyphenylene oxide resin, a polysulfone resin, a polyethersulfone resin, a polyarylene resin, a cycloolefin-based resin, a polyetherimide resin, a polyacetal resin, a polyvinyl acetal resin, a polyketone resin, a polyetherketone resin, a polyetheretherketone resin, a polyarylketone resin, a polyethernitrile resin, a liquid crystal resin, a polybenzimidazole resin, a polyparabanic acid resin, and a polyamide resin.

7. The carbon nanotube composite material of claim 5, wherein the carbon nanotube composite material comprises 0.5 to 10 wt % of the carbon nanotubes.

* * * * *